United States Patent
Seo et al.

(10) Patent No.: US 9,398,496 B2
(45) Date of Patent: Jul. 19, 2016

(54) METHOD AND APPARATUS FOR PERFORMING HANDOVER IN WIRELESS COMMUNICATION SYSTEM

(75) Inventors: Inkwon Seo, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 176 days.

(21) Appl. No.: 14/238,444

(22) PCT Filed: Aug. 10, 2012

(86) PCT No.: PCT/KR2012/006378
§ 371 (c)(1),
(2), (4) Date: Feb. 11, 2014

(87) PCT Pub. No.: WO2013/027952
PCT Pub. Date: Feb. 28, 2013

(65) Prior Publication Data
US 2014/0226623 A1  Aug. 14, 2014

Related U.S. Application Data

(60) Provisional application No. 61/525,200, filed on Aug. 19, 2011, provisional application No. 61/527,625, filed on Aug. 26, 2011.

(51) Int. Cl.
*H04W 36/00*  (2009.01)
*H04W 36/02*  (2009.01)
*H04W 56/00*  (2009.01)

(52) U.S. Cl.
CPC ........ *H04W 36/0055* (2013.01); *H04W 36/023* (2013.01); *H04W 36/026* (2013.01); *H04W 56/001* (2013.01)

(58) Field of Classification Search
None
See application file for complete search history.

(56) References Cited

U.S. PATENT DOCUMENTS

| 2005/0043046 | A1 | 2/2005 | Lee |
| 2007/0047493 | A1 | 3/2007 | Park et al. |
| 2009/0239539 | A1 | 9/2009 | Zhang et al. |
| 2010/0091735 | A1* | 4/2010 | Kim ............... H04L 1/0041 370/331 |
| 2010/0197308 | A1* | 8/2010 | Racz ............... H04W 36/0072 455/436 |
| 2012/0026976 | A1* | 2/2012 | Chang .............. H04L 5/001 370/331 |
| 2012/0163305 | A1* | 6/2012 | Nimbalker ........ H04W 52/0206 370/329 |

(Continued)

FOREIGN PATENT DOCUMENTS

| EP | 2193669 | 1/2015 |
| KR | 2010-0023919 | 3/2010 |
| KR | 2010-0059800 | 6/2010 |

OTHER PUBLICATIONS

PCT International Application No. PCT/KR2012/006378, Written Opinion of the International Searching Authority dated Feb. 27, 2013, 18 pages.

(Continued)

*Primary Examiner* — Candal Elpenord
(74) *Attorney, Agent, or Firm* — Lee, Hong, Degerman, Kang & Walmey; Jonathan Kang; Michael Monaco

(57) ABSTRACT

The present invention relates to a method for a terminal performing a handover in a wireless communication system, comprising a step of receiving from a first transmission point, information required for performing the handover to a second transmission point, wherein the information required for performing the handover includes information related to a system frame of the second transmission point.

8 Claims, 16 Drawing Sheets

(56) References Cited

U.S. PATENT DOCUMENTS

2012/0302240 A1* 11/2012 Tamaki ............. H04W 36/0016
455/436
2013/0083753 A1* 4/2013 Lee ................... H04W 72/0453
370/329

OTHER PUBLICATIONS

European Patent Office Application Serial No. 12826279.7, Search Report dated Sep. 2, 2015, 8 pages.

* cited by examiner

METHOD AND APPARATUS FOR PERFORMING HANDOVER IN WIRELESS COMMUNICATION SYSTEM

CROSS-REFERENCE TO RELATED APPLICATIONS

This application is the National Stage filing under 35 U.S.C. 371 of International Application No. PCT/KR2012/006378, filed on Aug. 10, 2012, which claims the benefit of U.S. Provisional Application Ser. Nos. 61/525,200, filed on Aug. 19, 2011, and 61/527,625, filed on Aug. 26, 2011, the contents of which are all hereby incorporated by reference herein in their entirety.

TECHNICAL FIELD

The present invention relates to a wireless communication system, and more particularly, to a method of performing a handover in a heterogeneous network environment and an apparatus therefor.

BACKGROUND ART

A wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system, MC-FDMA (multi carrier frequency division multiple access) system and the like.

DISCLOSURE OF THE INVENTION

Technical Task

A technical task of the present invention is to efficiently receive system information, which is received by a user equipment performing a handover in an interference situation.

Technical tasks obtainable from the present invention are non-limited the above-mentioned technical task. And, other unmentioned technical tasks can be clearly understood from the following description by those having ordinary skill in the technical field to which the present invention pertains.

Technical Solution

According to a first technical solution of the present invention, a method of performing a handover, which is performed by a user equipment in a wireless communication system, includes the step of receiving information necessary for performing the handover to a second transmission point, from a first transmission point, wherein the information necessary for performing the handover includes information on a system frame of the second transmission point.

According to a second technical solution of the present invention, a method of supporting a handover, which is supported by a first transmission point in a wireless communication system, includes the step of transmitting information necessary for a user equipment to perform a handover to a second transmission point, wherein the information necessary for performing the handover includes information on a system frame of the second transmission point.

According to a third technical solution of the present invention, a user equipment device in a wireless communication system includes a reception module and a processor, the processor configured to receive information necessary for a second transmission point to perform a handover from a first transmission point, wherein the information necessary for performing the handover includes information on a system frame of the second transmission point.

According to a fourth technical solution of the present invention, a first transmission point in a wireless communication system includes a transmission module and a processor, the processor configured to transmit information necessary for a user equipment to perform a handover to a second transmission point, wherein the information necessary for performing the handover includes information on a system frame of the second transmission point.

The first and the third technical solution may include following descriptions.

The information necessary for performing the handover may correspond to a system frame offset between the first transmission point and the second transmission point.

The information necessary for performing the handover may include at least one of a system bandwidth of the second transmission point or a physical hybrid automatic repeat request channel (PHICH) configuration.

The user equipment may receive information on valid time of at least one of the information on the system frame, the system bandwidth, and the physical hybrid automatic repeat request channel (PHICH) configuration.

The information on the system frame may be transmitted by the second transmission point on a physical broadcast channel (PBCH).

The information necessary for performing the handover may be received together with a handover command from the first transmission point.

The method may further include the steps of receiving a primary and a secondary synchronization signal of the second transmission point and transmitting a random access preamble to the second transmission point.

The second and the fourth technical solution may include following descriptions.

The information on the system frame of the second transmission point may correspond to a system frame offset between the first transmission point and the second transmission point.

The information necessary for performing the handover may include at least one of a system bandwidth of the second transmission point or a physical hybrid automatic repeat request channel (PHICH) configuration.

The first transmission point may transmit information on valid time of at least one of the information on the system frame, the system bandwidth, or the physical hybrid automatic repeat request channel (PHICH) configuration.

The information on the system frame may be transmitted by the second transmission point on a physical broadcast channel (PBCH).

The information necessary for performing the handover may be transmitted together with a handover command.

Advantageous Effects

According to the present invention, a user equipment performing a handover can efficiently receive system information even in an interference situation.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
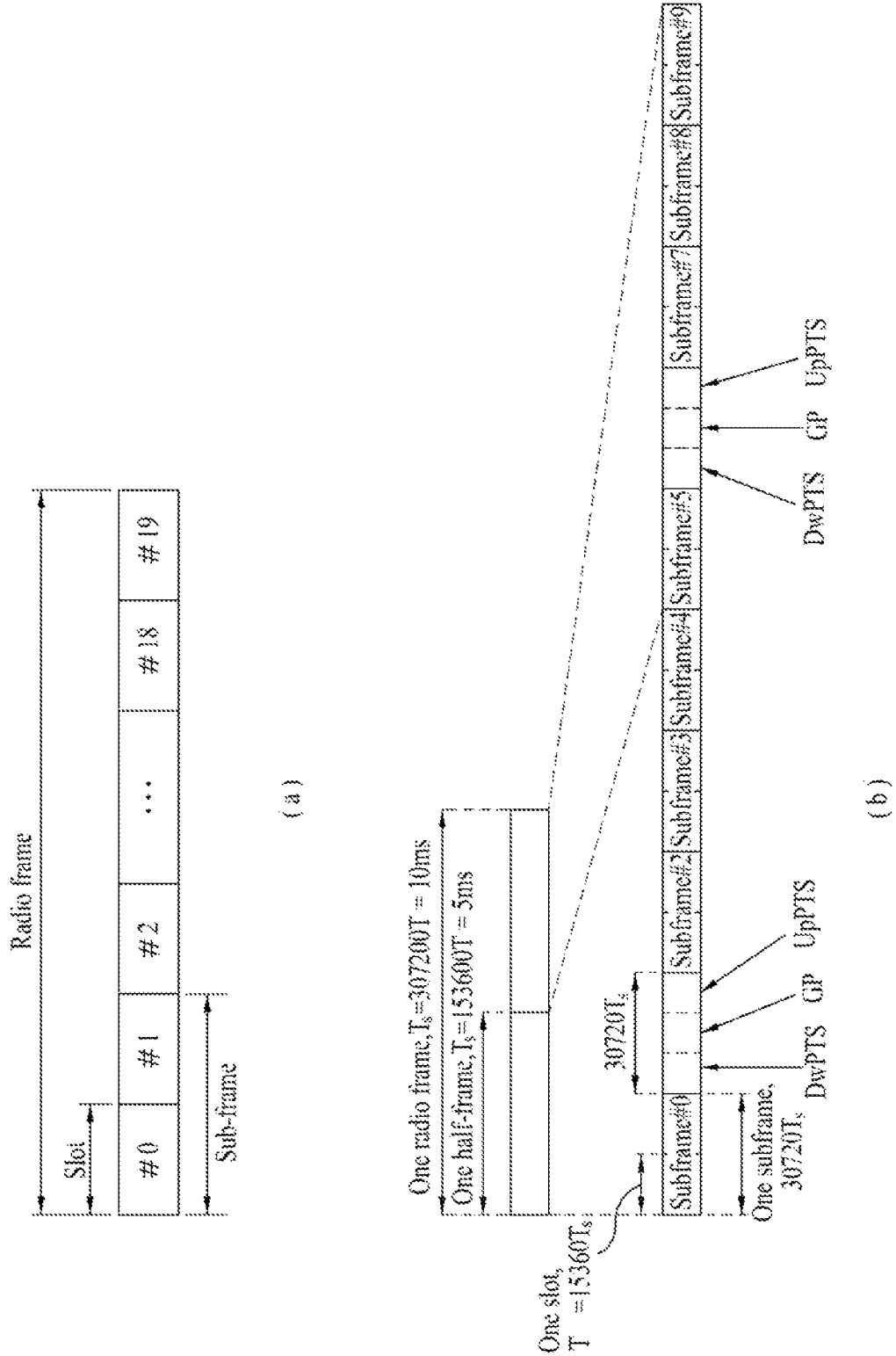
FIG. 1 is a diagram for a structure of a radio frame.

The following embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment.

In this specification, embodiments of the present invention are described centering on the data transmission/reception relations between an eNode B and a user equipment. In this case, an eNode B has a meaning of a terminal node of a network directly communicating with a user equipment. In this disclosure, a specific operation explained as performed by an eNode B may be performed by an upper node of the eNode B in some cases.

In particular, in a network constructed with a plurality of network nodes including an eNode B, it is apparent that various operations performed for communication with a user equipment can be performed by an eNode B or other network nodes except the eNode B. 'Base station (BS)' may be substituted with such a terminology as a fixed station, a Node B, an eNode B (eNB), an access point (AP) and the like. A relay may be substituted with such a terminology as a relay node (RN), a relay station (RS), and the like. And, 'terminal' may be substituted with such a terminology as a user equipment (UE), an MS (mobile station), an MSS (mobile subscriber station), an SS (subscriber station), or the like.

Specific terminologies used in the following description are provided to help understand the present invention and the use of the specific terminologies can be modified into a different form in a range of not deviating from the technical idea of the present invention.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Embodiments of the present invention may be supported by the standard documents disclosed in at least one of wireless access systems including IEEE 802 system, 3GPP system, 3GPP LTE system, 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may be usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP ($3^{rd}$ Generation Partnership Project) LTE (long term evolution) is a part of E-UMTS (Evolved UMTS) that uses E-UTRA. The 3GPP LTE adopts OFDMA in downlink (hereinafter abbreviated DL) and SC-FDMA in uplink (hereinafter abbreviated UL). And, LTE-A (LTE-Advanced) is an evolved version of 3GPP LTE. WiMAX may be explained by IEEE 802.16e standard (e.g., WirelessMAN-OFDMA reference system) and advanced IEEE 802.16m standard (e.g., WirelessMAN-OFDMA advanced system). For clarity, the following description mainly concerns 3GPP LTE and LTE-A standards, by which the technical idea of the present invention may be non-limited.

A structure of a radio frame is explained with reference to FIG. 1.

In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type 1 radio frame structure applicable to FDD (frequency division duplex) and a type 2 radio frame structure applicable to TDD (time division duplex) are supported.

FIG. 1 (a) is a diagram for a structure of a type 1 radio frame. A DL (downlink) radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDMA in downlink, OFDM symbol is provided to indicate one symbol interval. The OFDM symbol may be named SC-FDMA symbol or symbol interval. Resource block (RB) is a resource allocation unit and may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 2 or 3 OFDM symbols of each subframe may be allocated to PDCCH (physical downlink control channel), while the rest of the OFDM symbols are allocated to PDSCH (physical downlink shared channel).

FIG. 1 (b) is a diagram for a structure of a downlink radio frame of type 2. A type 2 radio frame includes 2 half frames. Each of the half frame includes 5 subframes, a DwPTS (downlink pilot time slot), a GP (guard period), and an UpPTS (uplink pilot time slot). Each of the subframes includes 2 slots. The DwPTS is used for initial cell search, synchronization, or a channel estimation in a user equipment. The UpPTS is used for channel estimation of a base station and matching a transmission synchronization of a user equipment. The guard period is a period for eliminating interference generated in uplink due to multi-path delay of a downlink signal between uplink and downlink. Meanwhile, one subframe includes 2 slots irrespective of a type of a radio frame.

The above-described structures of the radio frame are exemplary only. And, the number of subframes included in a radio frame, the number of slots included in the subframe and the number of symbols included in the slot may be modified in various ways.

Figure 2:
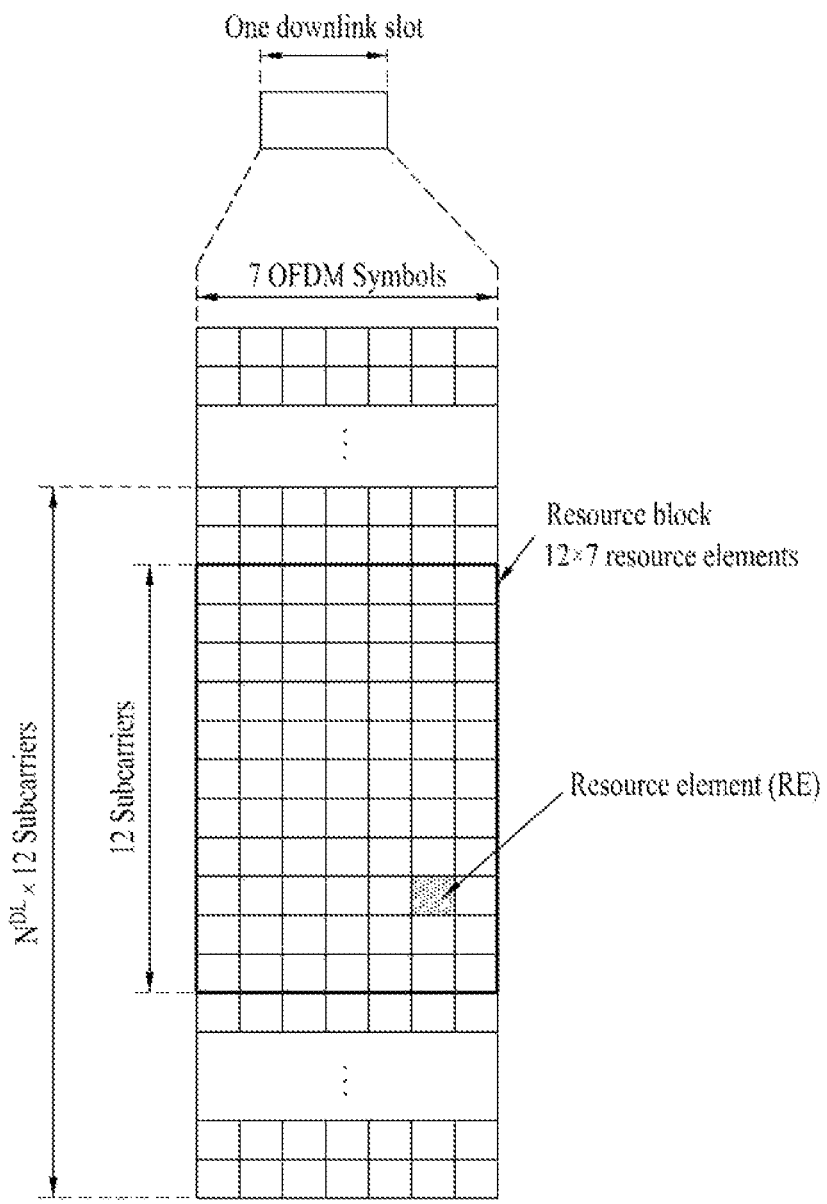
FIG. 2 is a diagram for a resource grid in a downlink slot.

FIG. 2 is a diagram for a resource grid in a downlink slot. Referring to FIG. 2, one downlink (DL) slot includes 7 OFDM symbols and one resource block (RB) includes 12 subcarriers in frequency domain, by which the present invention may be non-limited. For instance, in case of a normal CP (Cyclic Prefix), one slot includes 7 OFDM symbols. In case of an extended CP, one slot may include 6 OFDM symbols. Each element on a resource grid is called a resource element. One resource block includes 12×7 resource elements. The number $N^{DL}$ of resource blocks included in a DL slot may depend on a DL transmission bandwidth. And, the structure of an uplink (UL) slot may be identical to that of the DL slot.

Figure 3:
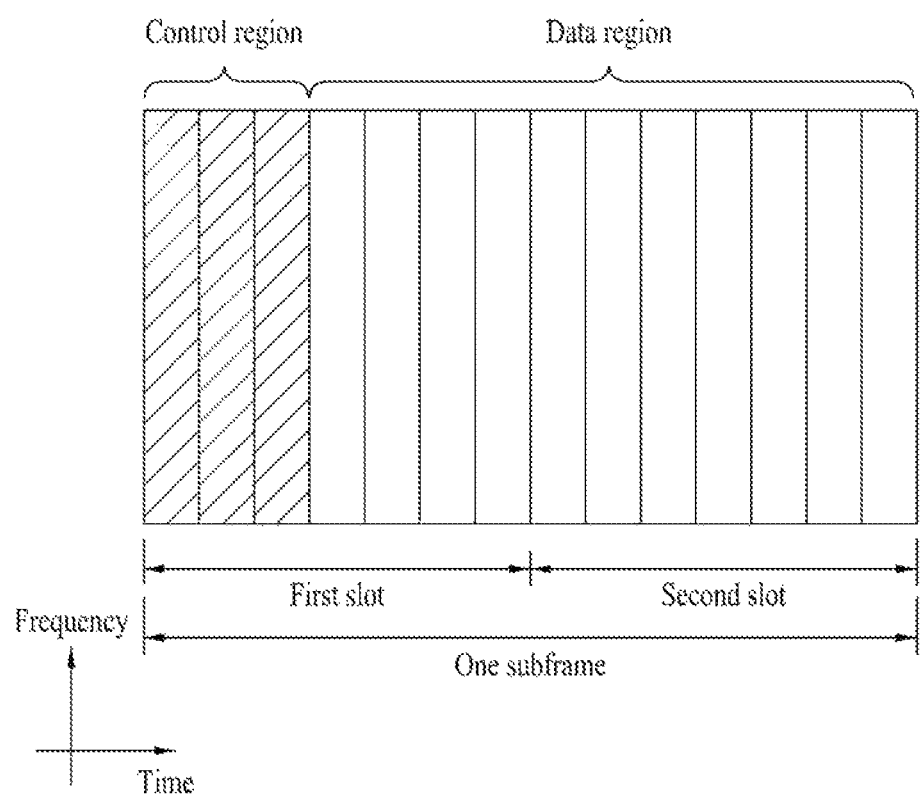
FIG. 3 is a diagram for a structure of a downlink subframe.

FIG. 3 is a diagram for a structure of a downlink (DL) subframe. Maximum 3 OFDM symbols situated in a head part of a first slot of one subframe correspond to a control region to which control channels are assigned. The rest of OFDM symbols correspond to a data region to which PDSCH (physical downlink shared channel) is assigned. Examples of DL control channels used by 3GPP LTE system may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and includes information on the number of OFDM symbols used for a transmission of a control channel within the subframe. The PHICH is a response channel in response to UL transmission and includes an ACK/NACK signal. Control information carried on PDCCH may be called downlink control information (hereinafter abbreviated DCI). The DCI may include UL scheduling information, DL scheduling information or a UL transmit (Tx) power control command for a random UE (user equipment) group. PDCCH is able to carry resource allocation and transmission format (or called a DL grant) of DL-SCH (downlink shared channel), resource allocation information (or called a UL grant) of UL-SCH (uplink shared channel), paging information on PCH (paging channel), system information on DL-SCH, resource allocation to an upper layer control message such as a random access response transmitted on PDSCH, a set of transmission power control commands for individual user equipments within a random user equipment (UE) group, activation of VoIP (voice over IP) and the like. A plurality of PDCCHs can be transmitted in a control region and a user equipment is able to monitor a plurality of the PDCCHs. PDCCH is configured with the aggregation of at least one or more contiguous CCEs (control channel elements). CCE is a logical assignment unit used to provide PDCCH with a code rate in accordance with a state of a radio channel. CCE corresponds to a plurality of REGs (resource element groups). A format of PDCCH and the number of bits of an available PDCCH are determined depending on correlation between the number of CCEs and a code rate provided by the CCEs. A base station determines PDCCH format in accordance with DCI to transmit to a user equipment and attaches CRC (cyclic redundancy check) to control information. The CRC is masked with a unique identifier (called RNTI (radio network temporary identifier) in accordance with an owner or usage of PDCCH. If the PDCCH is provided for a specific user equipment, the CRC can be masked with a unique identifier of the user equipment, i.e., C-RNTI (i.e., Cell-RNTI). If the PDCCH is provided for a paging message, the CRC can be masked with a paging indication identifier (e.g., P-RNTI (Paging-RNTI)). If the PDCCH is provided for system information, and more particularly, for a system information block (SIB), the CRC can be masked with a system information identifier (e.g., SI-RNTI (system information-RNTI). In order to indicate a random access response that is a response to a transmission of a random access preamble of a user equipment, CRC can be masked with RA-RNTI (random access-RNTI).

Figure 4:
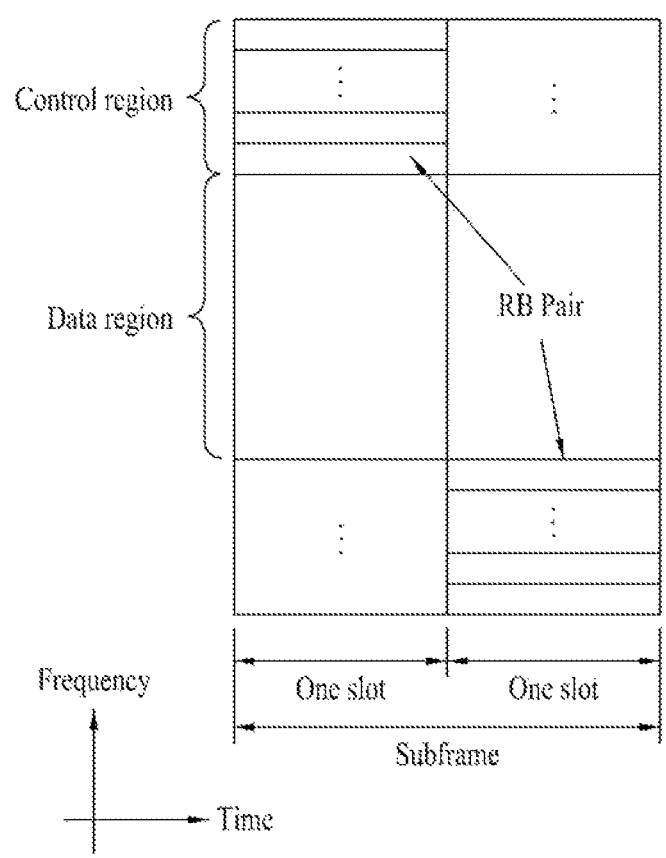
FIG. 4 is a diagram for a structure of an uplink subframe.

FIG. 4 is a diagram for a structure of an uplink (UL) subframe. Referring to FIG. 4, a UL subframe may be divided into a control region and a data region in frequency domain. A physical UL control channel (PUCCH), which includes UL control information, is assigned to the control region. And, a physical UL shared channel (PUSCH), which includes user data, is assigned to the data region. In order to maintain single carrier property, one user equipment does not transmit PUCCH and PUSCH simultaneously. PUCCH for one user equipment is assigned to a resource block pair (RB pair) in a subframe. Resource blocks belonging to the resource block (RB) pair may occupy different subcarriers in each of 2 slots. Namely, a resource block pair allocated to PUCCH is frequency-hopped on a slot boundary.

Heterogeneous Network Environment (Heterogeneous Deployments)

Figure 5:
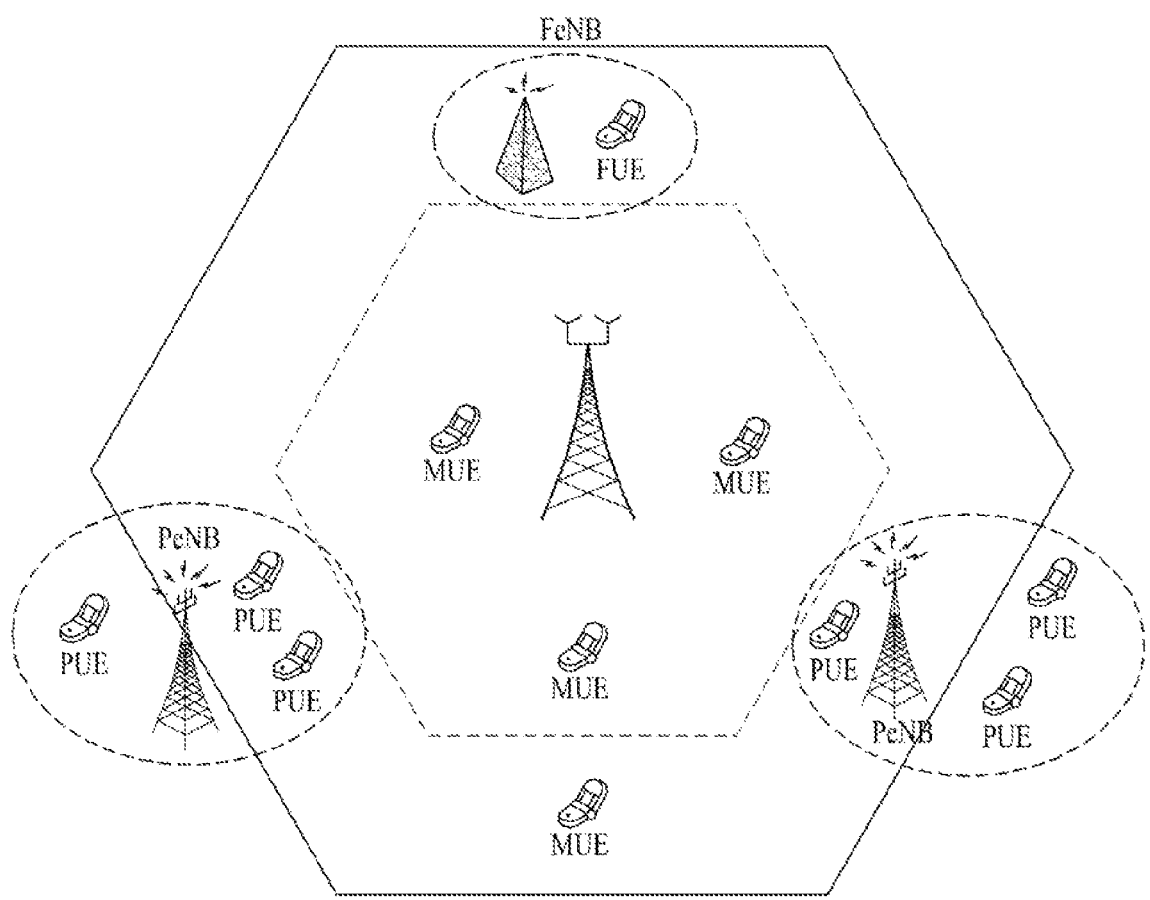
FIG. 5 is a diagram for a heterogeneous network.

FIG. 5 is a diagram of a heterogeneous network wireless communication system including a macro base station (MeNB) and a micro base station (PeNB or FeNB). In this specification, a terminology of a heterogeneous network means a network in which the macro base station (MeNB) and micro base stations (PeNB or FeNB) co-exist although an identical Radio Access Technology (RAT) is used.

The macro base station (MeNB) means a general base station of a wireless communication system having a wide coverage and high transmit power. The macro base station (MeNB) may also be called a macro cell.

For instance, the micro base station (PeNB or FeNB) can be called a micro cell, a pico cell, a femto cell, a home eNB (HeNB), a relay, or the like (the exemplified micro base station and the macro base station can be commonly called a transmission point). The micro base station (PeNB or FeNB) is a small version of the macro base station (MeNB) and can operate independently in a manner of performing most of functions of the macro base station. The micro base station is a sort of base stations installed (overlay) in an area covered by the macro base station or the base stations installable (non-overlay) in a radio shadow area where the macro base station is not able to cover. Compared to the macro base station (MeNB), the micro base station (PeNB or FeNB) can accommodate small numbers of user equipments with a narrower coverage and lower transmit power.

A user equipment (hereinafter called a macro UE) can be directly served from the macro base station (MeNB) and a user equipment (hereinafter called a micro UE) can be served from the micro base station (PeNB or FeNB) as well. In some cases, the user equipment (PUE) existing in the coverage of the micro base station (MeNB) may be served from the macro base station (MeNB).

According to whether an access restriction is applied to a user equipment, the micro base station can be classified into two types.

A first type corresponds to an OSG (Open access Subscriber Group) or non-CSG (Closed access subscriber Group) base station. The first type base station corresponds to a cell that permits an access of a legacy macro-UE or a micro-UE of a different micro base station. The legacy macro-UE and the like may perform a handover to a base station of the OSG type.

A second type corresponds to a CSG base station. The CSG base station does not permit an access of a legacy macro-UE or a micro-UE of a different micro base station. Hence, a handover to the CSG base station is not feasible.

Inter-Cell Interference Coordination (ICIC)

In the aforementioned heterogeneous network, interference between cells adjacent to each other may cause a problem. In order to solve the problem of inter-cell interference, inter-Cell interference coordination (ICIC) can be applied. A legacy ICIC can be applied to a frequency resource or a time resource.

As an example of the ICIC applied to a frequency resource, 3GPP LTE release-8 system divides a given whole frequency domain (e.g., system bandwidth) into one or more sub domains (e.g., physical resource block (PRB) unit) and defines a method of exchanging an ICIC message for each of the frequency sub domains between cells. For instance, as the information included in the ICIC message for the frequency resource, relative narrowband transmission power (RNTP) related to a DL transmit power is defined and UL interference overhead indication (IOI) related to UL interference, UL high interference indication (HII), and the like are defined in the 3GPP LTE release-8 system.

The RNTP is the information indicating DL transmit power used by a cell transmitting an ICIC message on a specific frequency sub domain. For instance, if an RNTP field for the specific frequency sub domain is set to a first value (e.g., 0), it may mean that the DL transmit power of a corresponding cell does not exceed a prescribed threshold on the corresponding frequency sub domain. Or, if the RNTP field for the specific frequency sub domain is set to a second value (e.g., 1), it may mean that the corresponding cell cannot promise the DL transmit power on the corresponding frequency sub domain. In other word, if the value of the RNTP field corresponds to 0, the DL transmit power of the corresponding cell can be considered as low. Yet, if the value of the RNTP field corresponds to 1, the DL transmit power of the corresponding cell cannot be considered as low.

The UL IOI is the information indicating an amount of UL interference experienced (or received) by a cell transmitting an ICIC message on the specific frequency sub domain. For instance, if an IOI field for the specific frequency sub domain is set to a value corresponding to a large amount of interference, it may mean that the corresponding cell is experiencing strong UL interference on the frequency sub domain. Having received the ICIC message, the cell can schedule a user equipment using low transmit power among the user equipments served by the cell on the frequency sub domain corresponding to the IOI indicating strong UL interference. By doing so, since the user equipments perform UL transmission with a low transmit power on the frequency sub domain corresponding to the IOI indicating the strong UL interference, the UL interference experienced by a neighboring cell (i.e., the cell transmitted the ICIC message) can be reduced.

The UL HII is the information indicating an extent of interference (or, UL interference sensitivity) capable of being occurred by a UL transmission for a corresponding frequency sub domain in a cell transmitting the ICIC message. For instance, if a HII field is set to a first value (e.g., 1) for a specific frequency sub domain, it may mean that the cell transmitting the ICIC message is likely to schedule a user equipment of a strong UL transmit power for the corresponding frequency sub domain. On the other hand, if the HII field is set to a second value (e.g., 0) for the specific frequency sub domain, it may mean that the cell transmitting the ICIC message is likely to schedule a user equipment of a weak UL transmit power for the corresponding frequency sub domain. Meanwhile, having received the ICIC message, the cell preferentially schedules a user equipment for the frequency sub domain where the HII field is set to the second value (e.g., 0) and schedules a user equipment capable of well operating despite of strong interference for the frequency sub domain where the FII field is set to the first value (e.g., 1), thereby avoiding the interference from the cell in which the ICIC message is transmitted.

Meanwhile, as an example of an ICIC for the time resource, 3GPP LTE-A system (or 3GPP LTE release-10 system) divides a given whole time domain into one or more sub domains (e.g., subframe unit) and defines a method of exchanging whether each of the time sub domains is silent between cells. The cell transmitting an ICIC message can deliver the information indicating that a silencing is performed in a specific subframe to neighbor cells and does not schedule PDSCH or PUSCH in the corresponding subframe. Meanwhile, a cell receiving the ICIC message can schedule UL and/or DL transmission for a user equipment in the subframe where the silencing is performed in the cell in which the ICIC message is transmitted.

Figure 6:
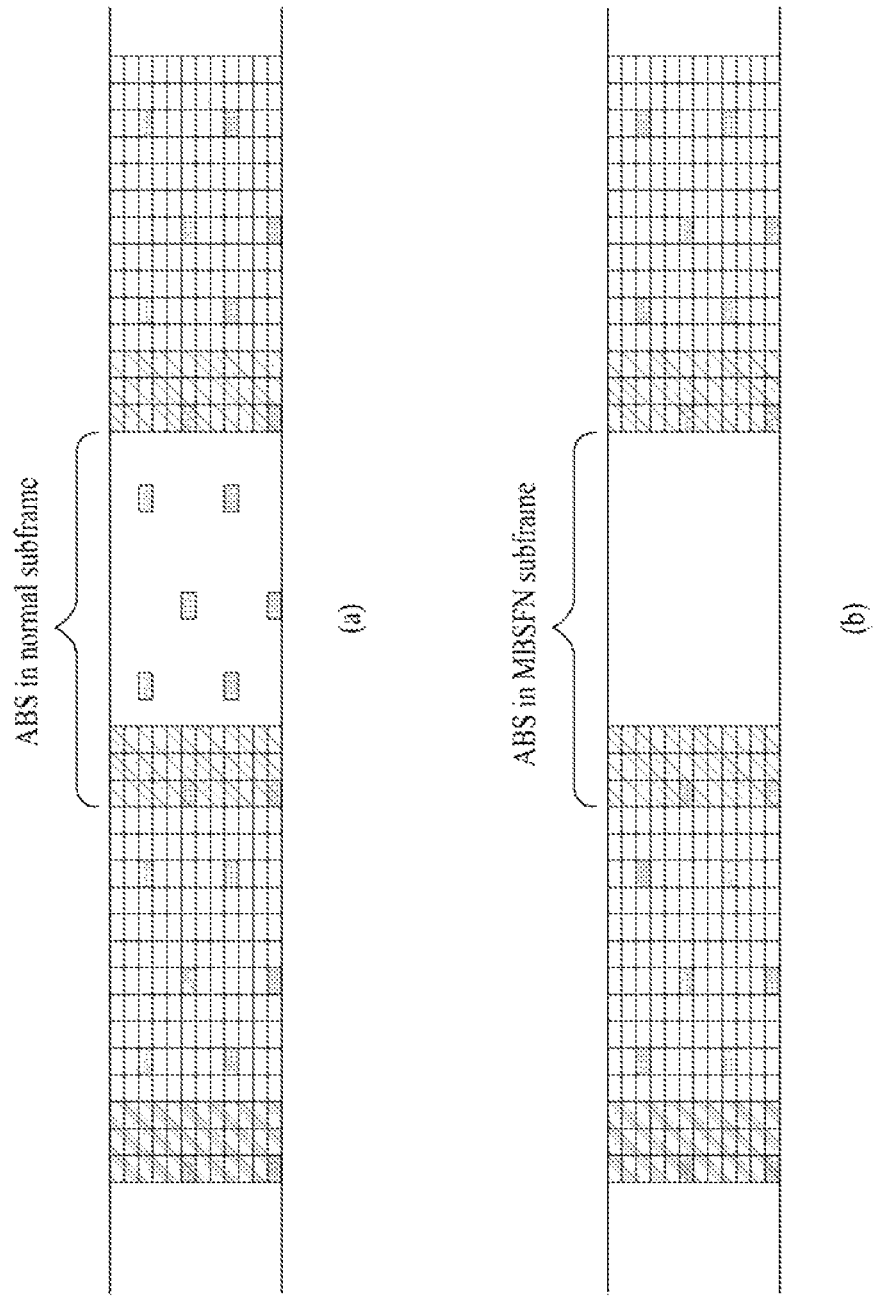
FIG. 6 is a diagram for explaining an ABS (almost blank subframe)

The silencing may mean that a specific cell does not perform (or performs transmission of 0 or weak power) an operation of most of signal transmission in UL and DL in a specific subframe. As an example of the silencing operation, the specific cell can configure the specific subframe as an almost blank subframe (ABS). As depicted in FIG. 6, there may exist two types of ABS. Specifically, as shown in FIG. 6 ($a$), there may exist a case (ABS in normal subframe) that a cell-specific reference signal (CRS) is transmitted and a data region is blank and a case (ABS in MBSFN subframe) that a CRS is also not transmitted. In case of the ABS in normal subframe, there may exist slight impact of interference of a CRS. Hence, the ABS in MBSFN subframe is superior in terms of interference. Yet, since a use of the ABS in MBSFN subframe is limited, it may be able to use the ABS in MBSFN subframe in combination with the ABS in normal subframe.

Handover

In the following description, a handover and a random access process, which are performed in an LTE system, are explained in detail.

Figure 7:
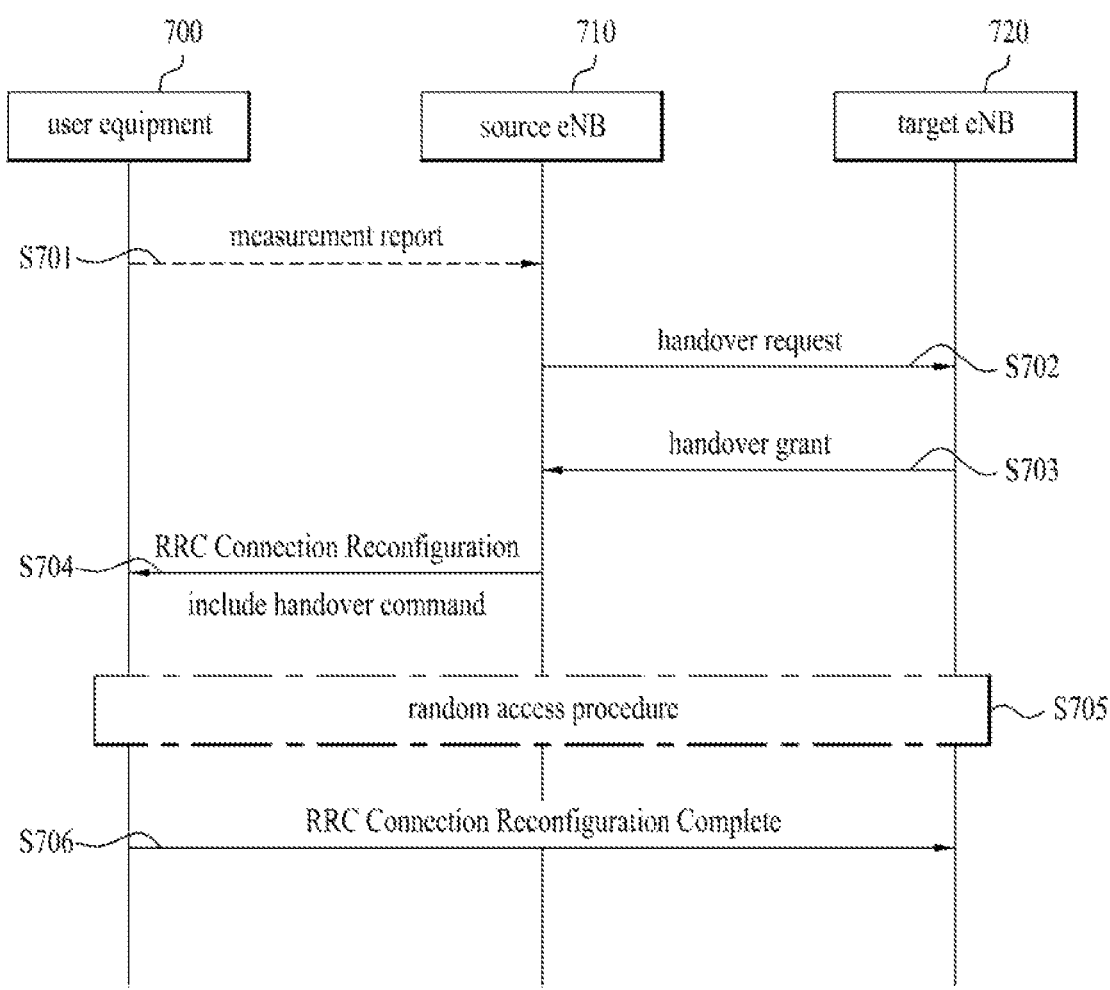
FIG. 7 is a flowchart for explaining a handover procedure.

FIG. 7 is a flowchart for explaining a handover procedure. Referring to FIG. 7, while monitoring measured values of a currently accessed serving eNB 710 and neighboring cells, if a handover trigger occurs, a user equipment 700 transmits a measurement report message to the serving eNB 710 [S701]. In this case, the measurement report may correspond to a reference signal receive power (RSRP), a received signal strength indicator (RSSI), a reference signal received quality (RSRQ), and the like.

The RSRP is a measurement value obtainable by measuring a size of a CRS in DL. The RSSI is a total received power value received by a corresponding user equipment. The RSSI is a measurement value including interference from neighboring cells, noise power, and the like. The RSRQ is a value measured in a form of 'N*RSRP/RSSI'. In this case, the N is the number of RBs of a corresponding bandwidth in case of measuring the RSSI.

Transmission of a measurement report can be determined by an event-based measurement report decision in the following.

i) a measurement value for a serving cell is greater than an absolute threshold (serving cell becomes better than absolute threshold), ii) a measurement value for a serving cell is less than an absolute threshold (serving cell becomes worse than absolute threshold), iii) a measurement value for a neighboring cell is greater than a measurement value for a serving cell as much as an offset value (neighboring cell becomes better than an offset relative to the serving cell), iv) a measurement value for a neighboring cell is greater than an absolute threshold (neighboring cell becomes better than absolute threshold), v) a measurement value for a serving cell is less than an absolute threshold and a measurement value for a neighboring cell is greater than another absolute threshold (serving cell becomes worse than one absolute threshold and neighboring cell becomes better than another absolute threshold).

In this case, the measurement value may correspond to the aforementioned RSRP and the like.

A measurement report may be set to be transmitted only when each of the conditions of the aforementioned measurement report decision is maintained more than a prescribed time period configured by a network in advance.

Figure 8:
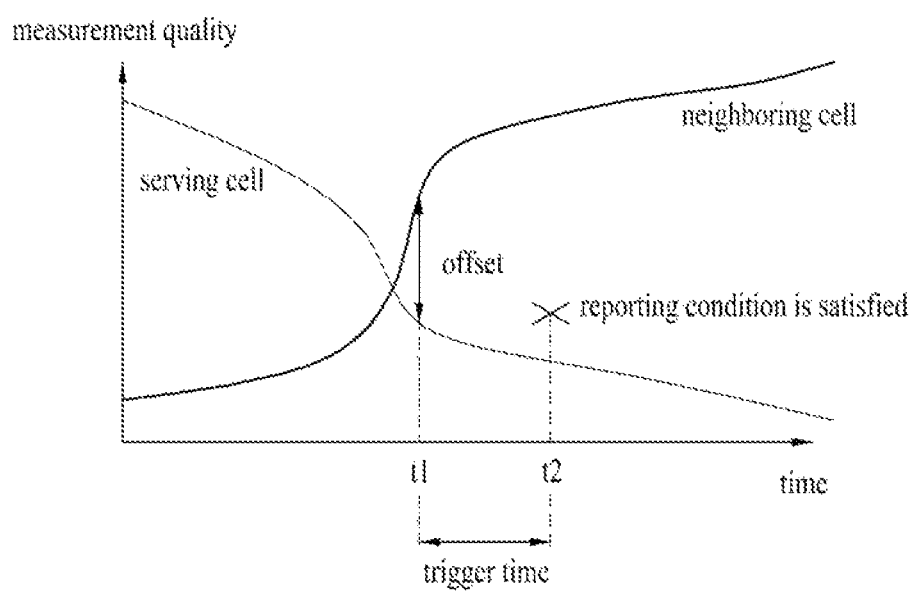
FIG. 8 is a diagram for explaining a determination of whether to transmit a measurement report in a handover procedure.

Among the aforementioned measurement report decision references, iii) is explained in more detail with reference to FIG. 8. A user equipment consistently measures RSRP and the like for a serving cell and a neighboring cell. As the user equipment continuously approaches to the neighboring cell, if a predetermined time (time to trigger) passes by (t2) from a time (t1) that the RSRP for the neighboring cell is greater than the RSRP for the serving cell as much as an offset value, the user equipment may perform a measurement report to the serving cell. In this case, the offset value, the predetermined time and the like can be configured by a network.

Subsequently, having received the measurement report from the user equipment 700, the serving eNB 710 transmits a handover request message to a target eNB 720 [S702]. In this case, the serving eNB 710 provides radio resource control (RRC) context information of the user equipment 700 to the target eNB 720.

The target eNB 720 determines whether to perform a handover of the user equipment based on the RRC context information. If the handover is determined to be performed, the target eNB 720 generates a handover command and the serving eNB 710 transmits an RRC connection reconfiguration (RRCConnectionReconfiguration) message including the handover command to the user equipment 700 [S704]. The RRC connection reconfiguration message may include radio resource configuration information, security configuration, a cell identifier (C-RNTI) and the like commonly applied to user equipments situating within a region of the target eNB 720.

Having received the RRC connection reconfiguration message, the user equipment 700 initiates a random access procedure to the target eNB 720 [S705]. If the random access procedure is successfully completed, the user equipment 700 transmits an RRC connection reconfiguration completion (RRCConnectionReconfigurationComplete) message to the target eNB 720 and terminates the handover procedure [S706].

Among the aforementioned handover procedure, the random access procedure is explained in detail in the following. In LTE system, a user equipment may perform the random access procedure in one of the following cases.

In case that a user equipment performs an initial access since the user equipment has no connection (RRC connection) with an eNB In case that a user equipment initially accesses a target cell in a handover procedure In case that a random access procedure is requested by an eNB In a situation that time synchronization of uplink is not matched or that a designated radio resource used to request a radio resource is not allocated, data in uplink is generated In case of a recovery procedure when a radio link failure or a handover failure occurs Based on this, a general contention-based random access procedure is explained in the following description.

Figure 9:
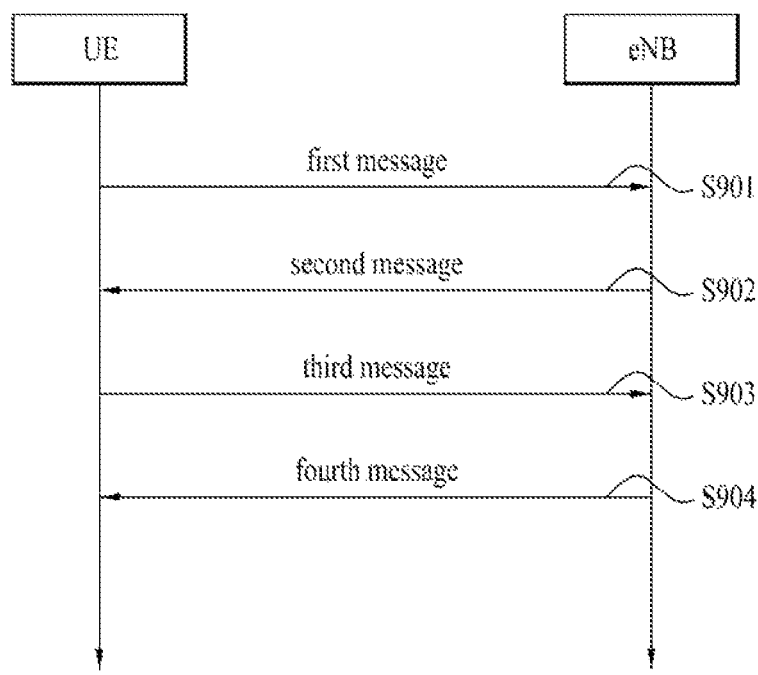
FIG. 9 is a flowchart for explaining a random access procedure.

FIG. 9 is a flowchart for explaining an operation procedure between a user equipment and a base station in a contention-based random access procedure.

(1) $1^{st}$ Message Transmission

First of all, a user equipment randomly selects a random access preamble from a set of random access preambles indicated by system information or a handover command, selects a PRACH (physical RACH) resource for carrying the random access preamble, and then transmits the random access preamble via the selected PRACH resource [S901].

(2) $2^{nd}$ Message Reception

After the user equipment has transmitted the random access preamble, the user equipment attempts a reception of its random access response in a random access response receiving window indicated by a base station through the system information or the handover command [S902]. In particular, the random access response information may be transmitted in format of MAC PDU. And, the MAC PDU may be carried on PDSCH (physical downlink shared channel). In order to properly receive the information carried on the PDSCH, the user equipment preferably monitors PDCCH (physical downlink control channel). In particular, information on a user equipment necessary to receive the PDSCH, a frequency and time information of a radio resource of the PDSCH, a transmission format of the PDSCH and the like may be preferably included in the PDCCH. Once the user equipment succeeds in the reception of the PDCCH transmitted to the user equipment, it may be able to appropriately receive a random access response carried on the PDSCH in accordance with the informations of the PDCCH. And, a random access preamble identifier (ID) (e.g., RAPID (random access preamble identifier), a UL grant indicating a UL radio resource, a temporary cell identifier (temporary C-RNTI), time synchronization correction value (timing advance command (TAC)) and the like can be included in the random access response.

As mentioned in the foregoing description, the random access preamble identifier is required for the random access response. Since random access response information for at least one or more user equipments may be included in one random access preamble, it may be necessary to indicate the UL grant, the temporary cell identifier and the TAC are valid for which user equipment. In this step, assume that the user equipment selects a random access preamble identifier matching the random access preamble selected by the user equipment in the step S902. Through this, the user equipment may be able to receive a UL grant, a temporary cell identifier temporary C-RNTI), time synchronization correction value (timing advance command: TAC) and the like.

(3) $3^{rd}$ Message Transmission

If the user equipment receives the random access response valid for the user equipment, it may process the informations included in the random access response. In particular, the user equipment applies the TAC and saves the temporary cell identifier. Moreover, the user equipment may be able to save data, which is to be transmitted in response to the valid random access response, in a message-3 buffer.

Meanwhile, using the received UL grant, the user equipment transmits data (i.e., a $3^{rd}$ message) to the base station [S903]. In the contention-based random access procedure, a base station is unable to determine which user equipments perform the random access procedure. In order for resolve the contention later, the base station needs to identify a user equipment.

As a method of including an identifier of a user equipment, two kinds of methods have been discussed. According to a $1^{st}$ method, if a user equipment has a valid cell identifier already allocated by a corresponding cell prior to the random access procedure, the user equipment transmits its cell identifier via UL transmission signal corresponding to the UL grant. On the contrary, if the user equipment fails to receive the allocation of a valid cell identifier prior to the random access procedure, the user equipment transmits its unique identifier (e.g., S-TMSI, random ID (Random Id), etc.). In general, the unique identifier is longer than the cell identifier. If the user equipment transmits data corresponding to the UL grant, the user equipment initiates a contention resolution timer (hereinafter abbreviated CR timer).

(4) $4^{th}$ Message Reception

After the user equipment has transmitted the data including its identifier via the UL grant included in the random access response, the user equipment waits for an instruction from the base station for the contention resolution. In particular, the user equipment may attempt a reception of PDCCH to receive a specific message [S904]. As a method of receiving the PDCCH, two kinds of methods have been discussed. As mentioned in the foregoing description, if the $3^{rd}$ message transmitted in response to the UL grant uses a cell identifier as its identifier, the user equipment attempts a reception of PDCCH using its cell identifier. If the identifier is a unique identifier, the user equipment may be able to attempt a reception of PDCCH using a temporary cell identifier included in the random access response. Thereafter, in the former case, if the PDCCH is received via its cell identifier before expiration of the contention resolution timer, the user equipment determines that the random access procedure is normally performed and then ends the random access procedure. In the latter case, if PDCCH is received via a temporary cell identifier before expiration of the contention resolution timer, the user equipment checks data carried on PDSCH indicated by the PDCCH. If the unique identifier of the user equipment is included in a content of the data, the user equipment determines that the random access procedure is normally performed and then ends the random access procedure.

Meanwhile, in an operation of a non-contention based random access procedure, unlike the contention based random access procedure shown in FIG. 9, a random access procedure is ended with a $1^{st}$ message transmission and a $2^{nd}$ message transmission only. Yet, before a user equipment transmits a random access preamble as a $1^{st}$ message to a base station, the user equipment receives assignment of the random access preamble from the base station, transmits the assigned random access preamble as the $1^{st}$ message to the base station, and then receives a random access response from the base station, whereby the random access procedure is ended.

CRE (Cell Range Extension)

CRE (cell range extension) means that user equipments, which are located in the vicinity of micro eNB (e.g., PeNB and the like) and interfered from the micro eNB, among the user equipments (MUE) connected to a macro eNB (e.g., MeNB) in the aforementioned heterogeneous network environment perform a handover to the micro eNB. Through this CRE execution, influence of previous interference can be reduced and a load balancing can be achieved.

Figure 10:
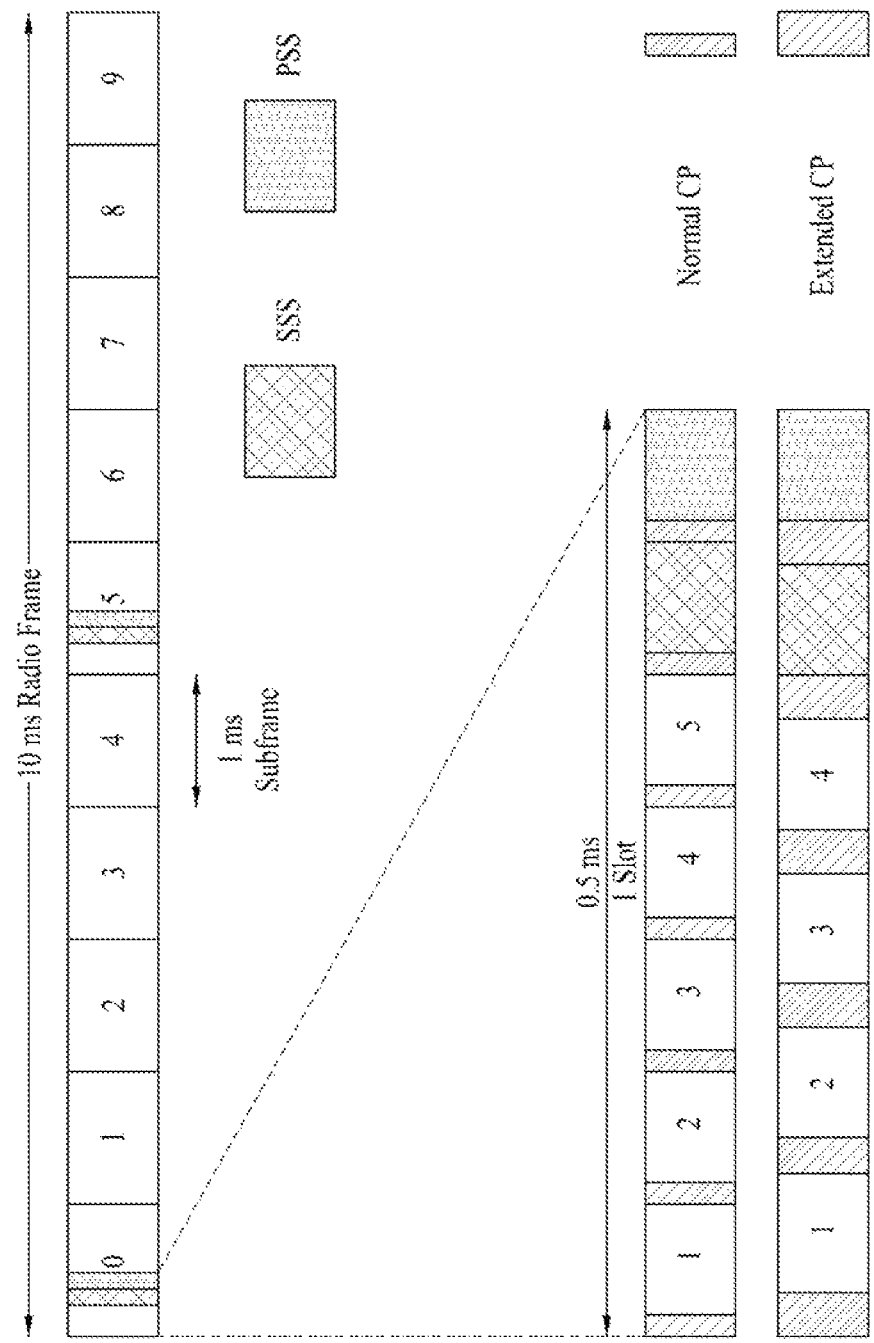
FIG. 10 is a diagram for explaining PSS/SSS in a FDD system.

Due to an attribute of the heterogeneous network environment, it is highly probable that such a measurement value as RSRP for the macro eNB is greater than RSRP for the micro eNB. This is because the micro eNB performs a transmission with a relatively low transmit power in general. Hence, in performing the CRE by a user equipment, the case, i.e., iii) a measurement value for a neighboring cell is greater than a measurement value for a serving cell as much as an offset value (neighboring cell becomes better than an offset relative to the serving cell) among the aforementioned measurement report transmission decision criteria can be applied. FIG. 10 is an example of the heterogeneous network environment to which the aforementioned decision criterion is applied. In FIG. 10, since a user equipment belonging to a shadow part satisfies the measurement report transmission decision criterion, a handover procedure can be initiated by transmitting a measurement report to the macro eNB. which is a serving eNB.

PSS (Primary Synchronous Signal)/SSS (Secondary Synchronous Signal)

FIG. 10 is a diagram for explaining PSS/SSS corresponding to synchronization signals used for a cell search in LTE/LTE-A system. Before the PSS and the SSS are explained, the cell search is explained. When a user equipment initially accesses a cell, the user equipment performs the cell search to make a handover from a currently accessed cell to a different cell or reselect a cell. The cell search may be achieved by obtaining a frequency and a symbol for a cell, obtaining DL frame synchronization of a cell, and determining a cell identifier (ID). Three cell identifiers form a single cell group and there may exist 168 cell groups.

For the cell search, a base station transmits PSS and SSS. A user equipment obtains 5 ms timing of a cell in a manner of detecting the PSS and may be able to know a cell identifier in a cell group. And, the user equipment may be able to know a radio frame timing and a cell group in a manner of detecting the SSS.

Referring to FIG. 10, the PSS is transmitted in a $0^{th}$ and $5^{th}$ subframe. More specifically, the PSS is transmitted on a last OFDM symbol of a first slot in the $0^{th}$ and that of the $5^{th}$ subframe, respectively. The SSS is transmitted on a second OFDM symbol from the last OFDM symbol of the first slot in the $0^{th}$ and the $5^{th}$ subframe. In particular, the SSS is transmitted on the OFDM symbol immediately before the OFDM symbol on which the PSS is transmitted. The aforementioned transmission timing is applied to a FDD system. In case of a TDD system, the PSS is transmitted on a $3^{rd}$ symbol, (i.e., DwPTS) in a $1^{st}$ subframe and that of a $6^{th}$ subframe, respectively and the SSS is transmitted on a last symbol of the $0^{th}$ subframe and that of the $5^{th}$ subframe, respectively. In particular, in the TDD system, the SSS is transmitted on a 3 symbols ahead of a symbol on which the PSS is transmitted.

The PSS is a Zadoff-Chu sequence of a length of 63. When the PSS is practically transmitted, 0 is padding to both ends of the sequence. Hence, the sequence is transmitted on 73 subcarriers (72 subcarriers except a DC subcarrier, i.e., 6 RBs) of a center of a system frequency bandwidth. The SSS consists of a sequence of a length of 62 where two sequences of length of 31 are frequency-interleaved. Similar to the PSS, the SSS is transmitted on 72 subcarriers of a center of a whole system bandwidth.

PBCH (Physical Broadcast Channel)

Figure 11:
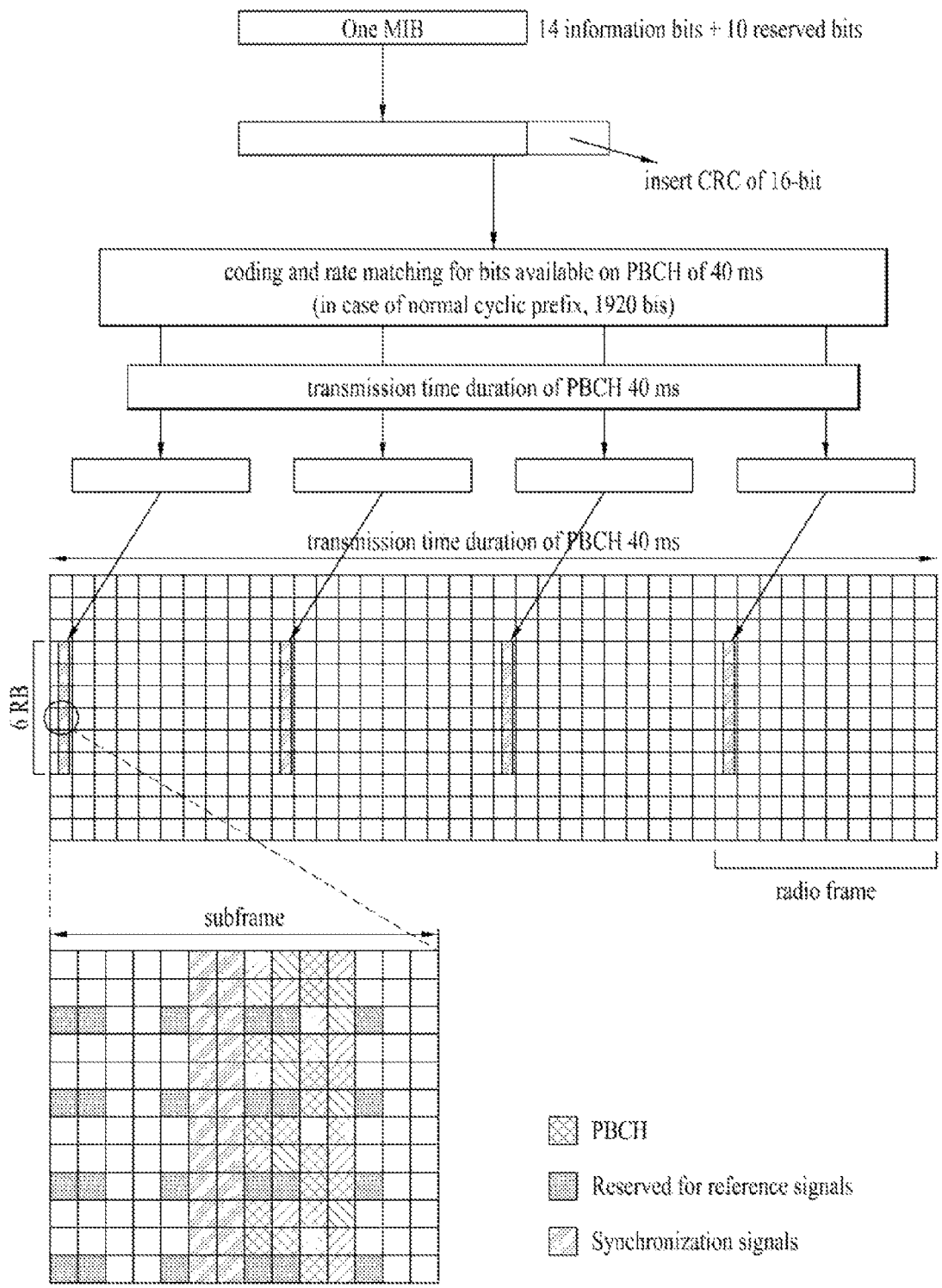
FIG. 11 is a diagram for explaining PBCH.

FIG. 11 is a diagram for explaining PBCH. The PBCH is a channel on which system information corresponding to a master information block (MIB) is transmitted. The PBCH is used to obtain the system information after a user equipment obtains synchronization via the aforementioned PSS/SSS and a cell identifier. In this case, the MIB may include information on a DL cell bandwidth, PHICH configuration information, a subframe number (system frame number (SFN)) and the like.

As depicted in FIG. 11, one MIB transport block is transmitted in each of first subframes of 4 contiguous radio frames, respectively. More specifically, the PBCH is transmitted on first 4 OFDM symbols of a $2^{nd}$ slot in a $0^{th}$ subframe of 4 contiguous radio frames. Hence, the PBCH for carrying one MIB is transmitted with a period of 40 ms. The PBCH is transmitted on 72 subcarriers of a center of a whole bandwidth on a frequency axis. 72 subcarriers correspond to 6RBs, which is a smallest DL bandwidth. This is configured to enable a user equipment to decode BCH without any problem although the user equipment does not know a size of the whole system bandwidth.

Figure 12:
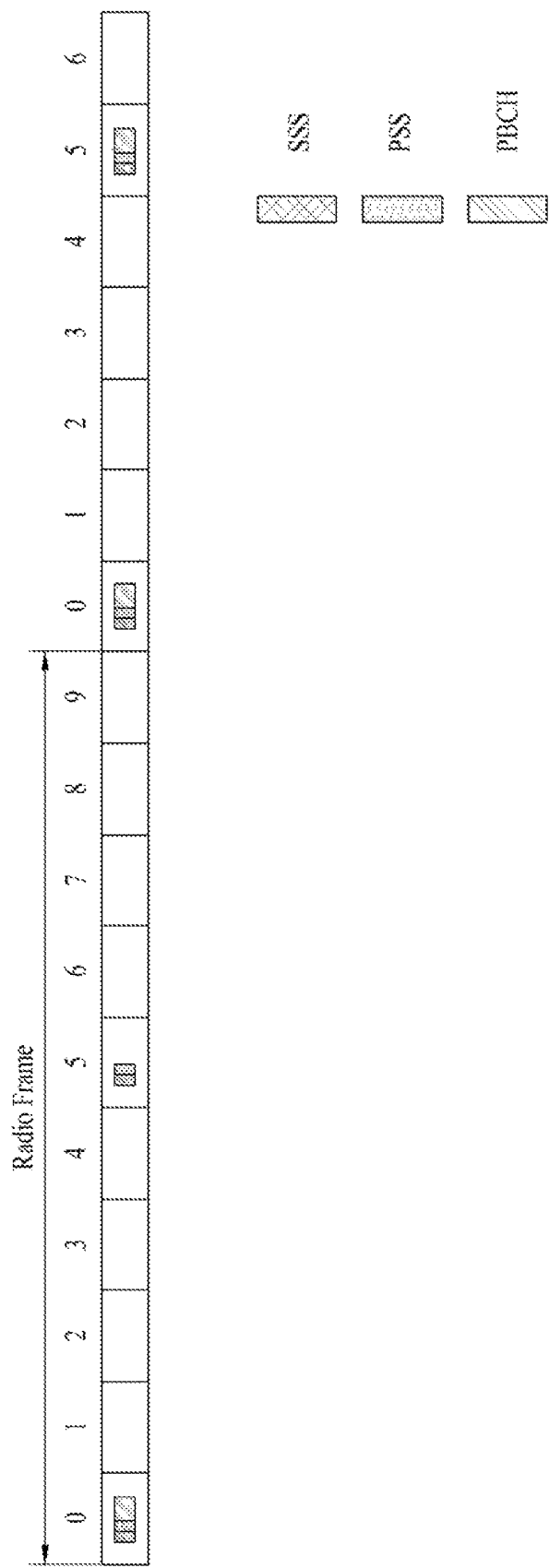
FIG. 12 is a diagram for a transmission of PSS/SSS and PBCH in a FDD system.

Transmission timing for the aforementioned PSS/SSS and the PBCH in a FDD system is depicted in FIG. 12. Referring to FIG. 12, the SSS and the PSS are transmitted on last 2 OFDM symbols of a first slot of a $0^{th}$ subframe and the PBCH is transmitted on first 4 OFDM symbols of a second slot in each radio frame. And, the SSS and the PSS are transmitted on last 2 OFDM symbols of a first slot of a $5^{th}$ subframe, respectively.

As mentioned in the foregoing description, although an ABS is applied for inter-cell interference coordination in a heterogeneous network environment, interference problem is not completely solved. This is because signals for securing operations of legacy user equipments including a CRS, a PBCH, and a PSS/SSS are transmitted although the ABS is applied. Specifically, for instance with reference to FIG. 13, under a circumstance where a first transmission point (macro eNB) and a second transmission point (pico eNB) exist in a manner of being mixed, PBCHs, which are transmitted by each of the transmission points to a user equipment (UE), may be collided with each other (in particular, if a subframe boundary of each of the transmission points is identical to each other, collision problem may become worse). In this case, it may be difficult for a user equipment (UE) to decode the PBCH transmitted from the second transmission point due to the PBCH transmitted from the first transmission point. And, as depicted in the drawing, it is highly probable that a user equipment (UE) making a handover to the second transmission point via a CRE may fail to obtain an MIB because the user equipment is unable to receive the PBCH. As mentioned in the foregoing description, since the CRE corresponds to a concept of extending a cell radius without an additional power increase, signal strength actually received from the first transmission point is stronger than the signal strength from the second transmission point.

Figure 13:
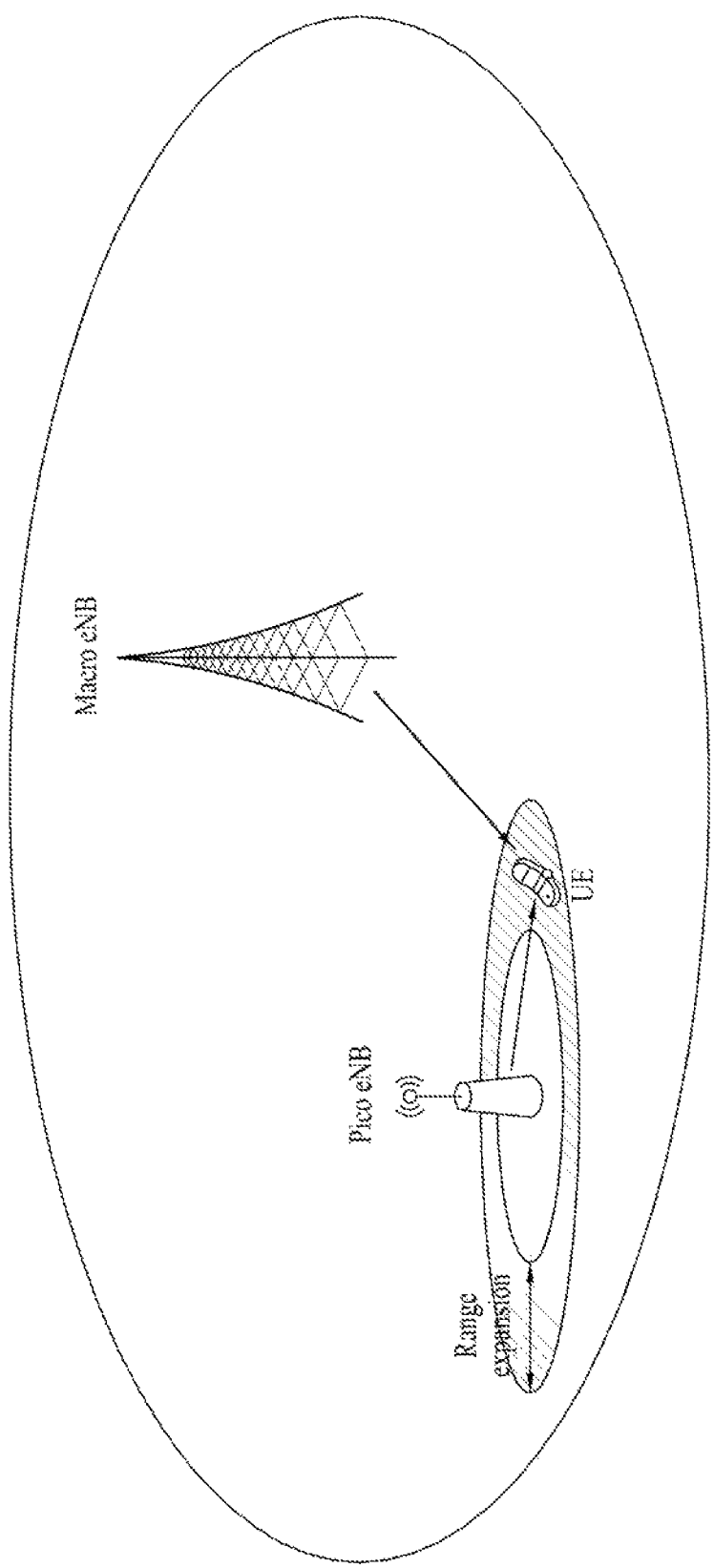
FIG. 13 is a diagram for an example of a heterogeneous network environment to which embodiment of the present invention is applicable.

And, under a circumstance depicted in FIG. 13, it may be difficult for a user equipment (UE) to receive a system information block (SIB) from the second transmission point. More specifically, the SIB is transmitted on PDSCH and a detailed location of the SIB is indicated by PDCCH. Reception of PDCCH and/or PCFICH, which is transmitted from the second transmission point, is severely interfered by a CRS and the like of the first transmission point. Hence, it may be difficult to decode the PDCCH. As a result, it may be difficult to completely decode the SIB.

In the aforementioned description, the first transmission point, the second transmission point, and the user equipment correspond to an aggressor cell, a victim cell, and a victim UE, respectively. In the following description, various embodiments for enabling the victim UE to efficiently receive the PBCH and/or the SIB of the second transmission point are disclosed. For clarity, the aggressor cell, the victim cell, and the victim UE are named the first transmission point, the second transmission point, and the user equipment, respectively.

Embodiment 1

A first embodiment relates to a method of receiving system information, which is received from the first transmission point instead of the second transmission point in case that the user equipment receiving a service from the first transmission point performs a handover to the second transmission point. In this case, decision on whether to make a handover of the user equipment to the second transmission point may be caused by a measurement report made by one of the aforementioned 4 measurement report criteria or determined by the first transmission point for a cell distribution gain.

Information necessary for performing a handover, which is signaled by the first transmission point for the user equipment, i.e., system information may include i) system bandwidth of the second transmission point ii) PHICH duration and/or PHICH configuration for a PHICH resource and the like, and iii) information on a system frame number. In particular, the first transmission point may inform the user equipment of the MIB transmitted on the PBCH in the second transmission point while performing the handover process.

In this case, the information on the system frame of the second transmission point may correspond to a system frame number (SFN) identical to a case that the information is transmitted on the PBCH. Yet, the information on the system frame of the second transmission point preferably corresponds to an SFN difference between the first and the second transmission point (a system frame offset between the first and the second transmission point). If a frame boundary of the first transmission point is not aligned with that of the second transmission point, a subframe offset as well as the SFN offset can be informed.

Meanwhile, the first transmission point can inform a user equipment in a handover process of at least one of informations consisting of a system information block of the second transmission point. In particular, it may configure the first transmission point to transmit an SIB not transmitted on PBCH, which is known for a dynamic BCH (dynamic Broadcast Channel), to the user equipment.

In addition, together with the aforementioned information necessary for performing the handover for signaling the user equipment, the first transmission point may transmit information on valid time of the information as well. While a cell acquisition procedure is performed by the user equipment after the user equipment has received such system information as the MIB and/or SIB and the like of the second transmission point from the first transmission point, this information is also transmitted to the user equipment to prevent the user equipment from using invalid system information in case of changing the system information by the second transmission point. To this end, the second transmission point can signal the first transmission point for current system information and duration of maintaining the current system information without any change via X2 interface and the like.

As mentioned in the foregoing description, if the user equipment receives the information on the valid time together with the system information of the second transmission point, the user equipment performs the cell acquisition procedure to the second transmission point for the valid time. If the user equipment fails to acquire a cell within the valid time, the user equipment may make a request for the system information of the second transmission point to the first transmission point. Or, the first transmission point may signal the user equipment for the system information of the second transmission point on timing of expiration of the valid time or before and after the timing.

The aforementioned contents are explained in accordance with a handover procedure in the following. The user equipment monitors reception signals received from the first and the second transmission point. If a prescribed condition is satisfied, the user equipment transmits a measurement report to the first transmission point (or, a handover may be indicated to the user equipment by a necessity of the first transmission point irrespective of the measurement report of the user equipment). Having received the measurement report, the first transmission point transmits a handover request, information for a handover preparation, and the like to the second transmission point. The second transmission point transmits a handover request acknowledge including a handover command to the first transmission point in response to the handover request.

In this case, as mentioned in the foregoing description, the second transmission point may transmit MIB, SIB, and the like, which are transmitted to PBCH, PDSCH, and the like by the second transmission point, together. The first transmission point transmits the handover command, RRCConnectionReconfiguration, the informations (MIB, SIB, a new C-RNTI, a dedicated RACH preamble and the like) necessary for performing the handover and received from the second transmission point to the user equipment. The user equipment performs synchronization with the second transmission point based on the informations. In this case, since the MIB is already received from the first transmission point, it is not necessary to decode PBCH of the second transmission point. Having performed the synchronization with the second transmission point, the user equipment performs a random access procedure for the second transmission point.

Embodiment 2

Unlike the embodiment 1, embodiment 2 relates to a method of completely decoding PBCH despite of interference from the first transmission point under an assumption that a user equipment should receive the PBCH. The user equipment can receive PBCH of the second transmission point in a manner of preferentially decoding the PBCH received from the first transmission point having signal strength relatively strong and high probability of successful decoding and eliminating component of the first transmission point from the total received signals based on decoded data.

Figure 14:
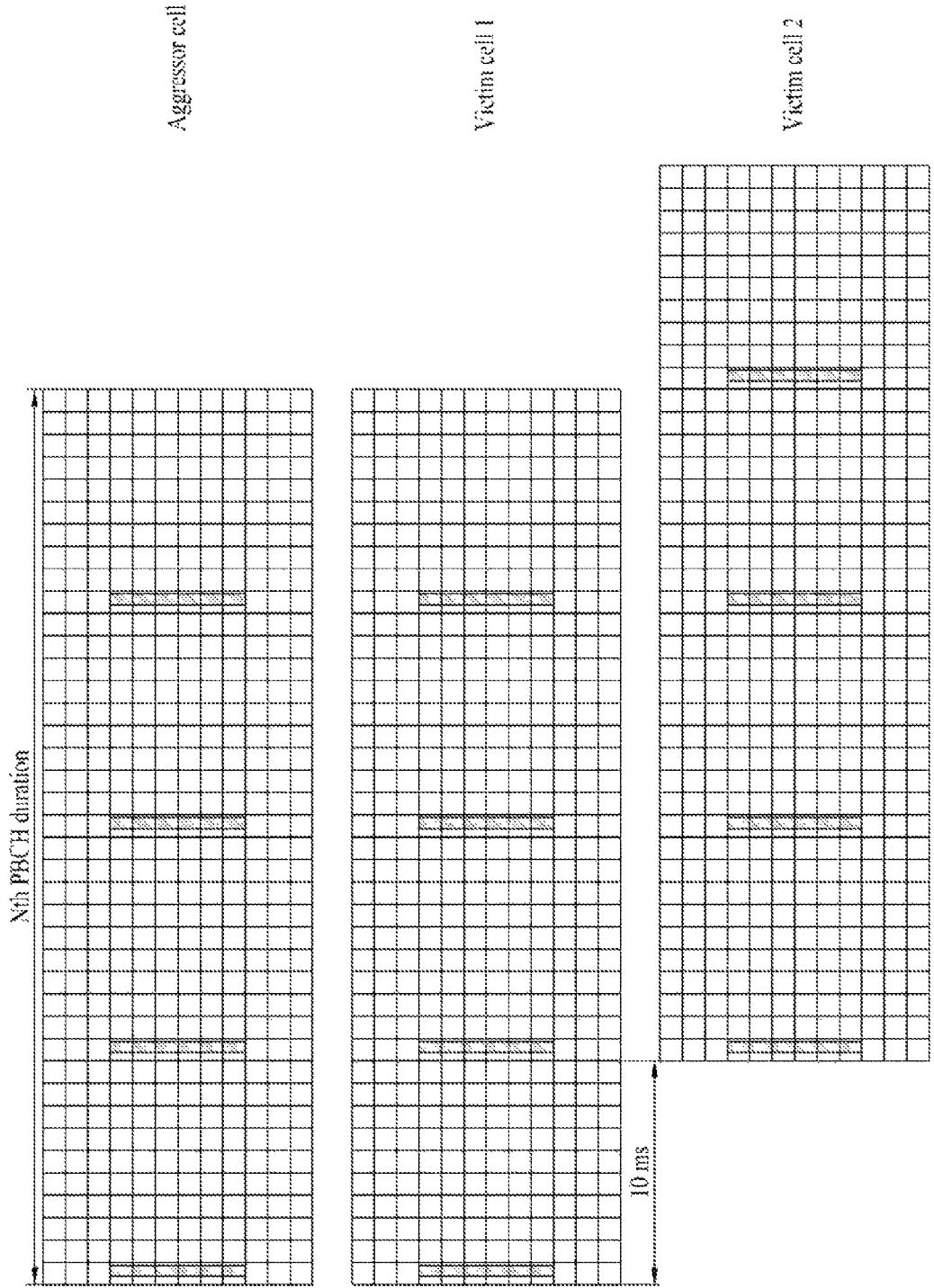
FIG. 14 is a diagram for explaining PBCH cancellation according to one embodiment of the present invention.

FIG. 14 is a diagram for explaining the embodiment 2 of the present invention. FIG. 14 shows a case that a PBCH boundary of the first transmission point (aggressor cell) is matched with a PBCH boundary of the second transmission point (victim cell 1) and a case that the PBCH boundary of the first transmission point (aggressor cell) is apart from a PBCH boundary of a second transmission point (victim cell 2) as much as one radio frame.

First of all, if the PBCH boundary of the first transmission point is matched with the PBCH boundary of the second transmission point, the user equipment may generate PBCH signal of the first transmission point in a manner of decoding the PBCH of the first transmission point having strong reception strength. And, the user equipment obtains a channel estimation result for the first transmission point and a combined signal component of the generated PBCH signal and may be able to eliminate the combined signal component from the total received signals. As a result, since the remaining signal component corresponds to a PBCH signal component of the second transmission point, decoding on the PBCH of the second transmission point can be performed using the remaining signal component. In doing so, the total received signals of the PBCH are necessary to be stored in a buffer until the PBCH signal of the first transmission point is generated.

As depicted in the drawing, if the PBCH boundary of the first transmission point is apart from the PBCH boundary of the second transmission point as much as one radio frame, decoding on the PBCH of the second transmission point can be performed for 3 radio frames from a reception signal corresponding to a $2^{nd}$ radio frame on the basis of the first transmission point using the aforementioned method.

If PBCH content of the first transmission point is maintained in a next PBCH duration, in particular, if a system bandwidth, PHICH configuration and the like except a SFN are not modified, the user equipment may be able to decode the PBCH of the second transmission point in a manner of generating a PBCH signal of the first transmission point in the next PBCH duration without decoding the PBCH of the first transmission point. To this end, the first transmission point may signal the user equipment for the duration of which the system bandwidth, the PHICH configuration, and the like are maintained.

According to the aforementioned method, since the total received signals are needed to be stored in a buffer until the PBCH signal of the first transmission point is generated from the total received signals, it may become a burden for the user equipment. Moreover, in case of storing the total received signals in the buffer, an additional buffer is required because granularity should be largely configured. More specifically, according to an eICIC scenario, a size of a signal of the first transmission point (e.g., macro eNB) is greater than that of the second transmission point (e.g., pico eNB) as much as 10 dB. Hence, in order to decode a PBCH reception signal of the second transmission point including a signal of a relatively small size, a considerable amount of buffer size is required since a quantization unit of the total received signals should be densely configured. Hence, two methods are disclosed in the following description to solve the aforementioned problem.

As a first method, the first transmission point may transmit a PBCH duration offset value between the first transmission point and the second transmission point and a duration for which the PBCH of the first transmission point is maintained without any change. In this case, the duration for which the PBCH is maintained may correspond to a PBCH duration unit or a frame unit. For instance, the first transmission point may inform the user equipment that the PBCH duration offset between the first transmission point and the second transmission point corresponds to one radio frame and the PBCH of the first transmission point is maintained for 4 PBCH durations. The user equipment decodes the PBCH of the first transmission point using the aforementioned information. If the user equipment succeeds in decoding the PBCH of the first transmission point in one radio frame, the user equipment generates a PBCH signal to be transmitted by the first transmission point during the following 40 ms and may be able to perform PBCH cancellation to decode a PBCH of the second transmission point from a next frame. If the user equipment fails to decode the PBCH of the second transmission point in a first frame, the user equipment may store a signal component except interference of PBCH information transmitted in the first frame, i.e., a remaining signal component after a PBCH signal component of the first transmission point is eliminated from the total received signals in a buffer to combine with PBCH information of a next frame. In this case, since the signal component from which interference is eliminated is stored only in the buffer, a size of a required buffer can be reduced since a necessity of densely configuring a quantization unit is reduced.

As a second method, unlike the aforementioned, it may be able to configure to perform a decoding on the PBCH of the second transmission point after a decoding on the first transmission succeeds. Specifically, the user equipment decodes the PBCH of the first transmission point and may be then able to decode the PBCH of the second transmission point in a manner of performing PBCH cancellation in a firstly appearing PBCH duration of the second transmission point after a timing point on which the decoding on the PBCH of the first transmission point ends. The user equipment may not store the PBCH of the second transmission point in a buffer until the user equipment generates a PBCH signal in a manner of decoding the PBCH of the first transmission point.

According to the aforementioned method, it is necessary for the first transmission point to transmit the aforementioned PBCH duration offset value between the first transmission point and the second transmission point and duration for which the PBCH of the first transmission point is maintained without any change. Moreover, this method can be applied to both a case that a PBCH duration boundary of the first transmission point is matched with that of the second transmission point and a case that the PBCH duration boundary of the first transmission point is not matched with that of the second transmission point.

Embodiment 3

Embodiment 3 relates to a method for the first transmission point to broadcast all/a part of system information of neighboring cells including the second transmission point via PDSCH. In this case, the broadcasted system information is used not for user equipments having accessed the first transmission point but for user equipments having accessed the neighboring cells.

A user equipment may be able to receive system information (MIB, SIB, and the like) on PDSCH transmitted by the first transmission point. In this case, the PDSCH may be transmitted in a subframe, which is not scheduled by a neighboring cell to which the user equipment belongs, e.g., the second transmission point (in this case, an aggressor cell may correspond to a normal subframe instead of an ABS). Or, the PDSCH to which the system information is transmitted can also be checked in a subframe scheduled by the second transmission point. Yet, in this case, since there may exist interference in receiving the PDSCH of the scheduled second transmission point due to the PDSCH of the first transmission point, it may be able to separately configure a PDSCH region to which the system information is transmitted by the first transmission point and a PDSCH region to which data is transmitted by the second transmission point.

And, the second transmission point may be able to inform user equipments in a corresponding cell that the system information of the second transmission point is transmitted via the PDSCH region of the first transmission point via an upper layer signaling. If the system information is modified, the second transmission point can inform the first transmission point of whether the system information is modified and modified contents via X2 signaling and the like.

Meanwhile, in order for the first transmission point to transmit system information of a neighboring cell, a new SI-RNTI can be used in a manner of being defined. The new SI-RNTI can include all or a part of MIB/SIB of the neighboring cell. If there exist a plurality of second transmission points (e.g., if there exist a plurality of pico cells), cell ID information can be included in the SI-RNTI to identify a transmission point. If the new SI-RNTI is used, a PDSCH resource, which is used for transmitting the system information of the neighboring cell, can be freely designated. Instead, a user equipment should check a new SI-RNTI in a manner of performing a blind decoding. Hence, a part of regions among the PDSCH regions of the first transmission point can be reserved for a region used for transmitting the system information of the neighboring cell. In this case, cell ID information can also be included to identify a transmission point. The user equipment may be able to check the system information of the neighboring cell in the reserved region.

Embodiment 4

Embodiment 4 relates to a method of repeating PBCH of the second transmission point.

Figure 15:
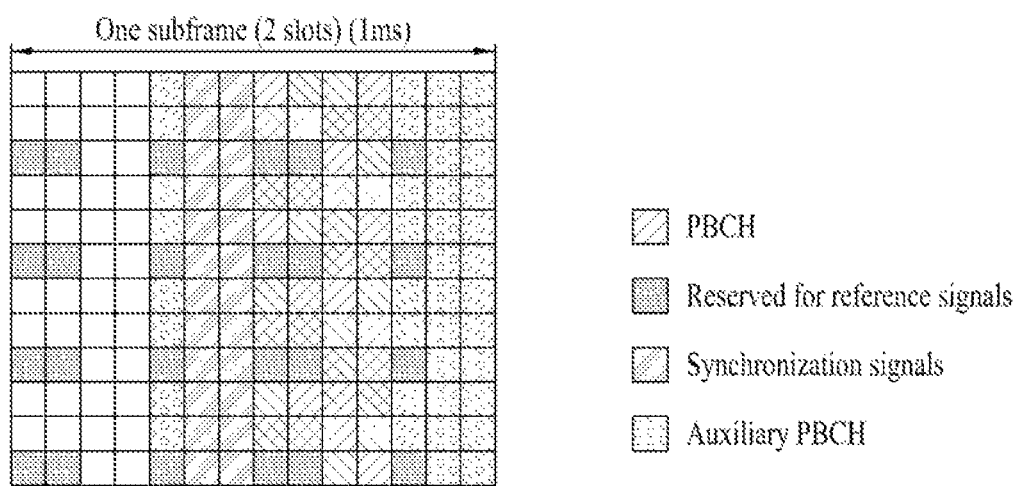
FIG. 15 is a diagram for explaining PBCH repetition according to one embodiment of the present invention.

FIG. 15 shows one of 6 RBs situating at a center of a $0^{th}$ subframe to which the PBCH of the second transmission point is transmitted. As mentioned in the foregoing description, the PBCH is transmitted on first 4 OFDM symbols of a second slot of the $0^{th}$ subframe. According to the present embodiment, it may be able to configure that the PBCH is repeatedly transmitted on $5^{th}$ OFDM symbol of a $1^{st}$ slot and $5^{th}$ to $7^{th}$ OFDM symbols of the second slot (in other word, an auxiliary PBCH is transmitted). By doing so, it may be able to increase detection rate of the PBCH for the interference from the first transmission point. Moreover, in case of transmitting the auxiliary PBCH, a subframe corresponding to the first transmission point in time can be configured as an ABS. If the subframe corresponding to the first transmission point in time is not configured as the ABS, the corresponding region can be muted as well.

In case of using the aforementioned auxiliary PBCH, it is necessary for user equipments belonging to the second transmission point to know a region to which the auxiliary PBCH is transmitted as well as a legacy PBCH region. Hence, whether the auxiliary PBCH is transmitted and/or a resource region to which the auxiliary PBCH is transmitted can be informed to the user equipments via an upper layer signaling. (These informations may be delivered to a neighboring cell via an X2 interface and the like for the user equipments performing neighbor cell measurement, handover, and the like in the neighboring cell.) In this case, in case of the resource region to which the auxiliary PBCH is transmitted, the resource region may be determined in advance to reduce signaling overhead. (In this case, whether the auxiliary PBCH is transmitted may be signaled only.)

If the auxiliary PBCH is transmitted and the resource region to which the auxiliary PBCH is transmitted is signaled or determined in advance, it may be able to configure a user equipment to monitor the auxiliary PBCH only when a decoding on a legacy PBCH region has failed. In this case, the user equipment may correspond to a user equipment initially accessing the second transmission point.

In case of a specific cell ID, the signaling for informing of whether the auxiliary PBCH is transmitted may be omitted in a manner that the specific cell ID is configured to decode under an assumption that the auxiliary PBCH is transmitted.

As a method for informing of a resource region to which the auxiliary PBCH is transmitted, if the auxiliary PBCH is transmitted as depicted in FIG. 15, corresponding OFDM symbol can be signaled. If a user equipment accesses the first transmission point where a resource region allocated for a PDSCH purpose from the first transmission point is overlapped with a resource region allocated for an auxiliary PBCH purpose, the user equipment assumes that a rate matching for the PDSCH is performed for the resource region allocated for the auxiliary PBCH purpose and may be able to demodulate the PDSCH.

In addition, if a user equipment of a neighboring cell decodes the PBCH of the second transmission point to perform neighbor cell measurement, a handover, or the like, the second transmission point can deliver information on whether an auxiliary PBCH is used and/or a resource to which the auxiliary PBCH is transmitted to neighboring cells via X2 signaling and the like. Having received the corresponding information, the neighboring cell may inform user equipments within the neighboring cell of the information via a scheme of adding the corresponding information to a neighbor cell list, an upper layer signaling, or the like.

Figure 16:
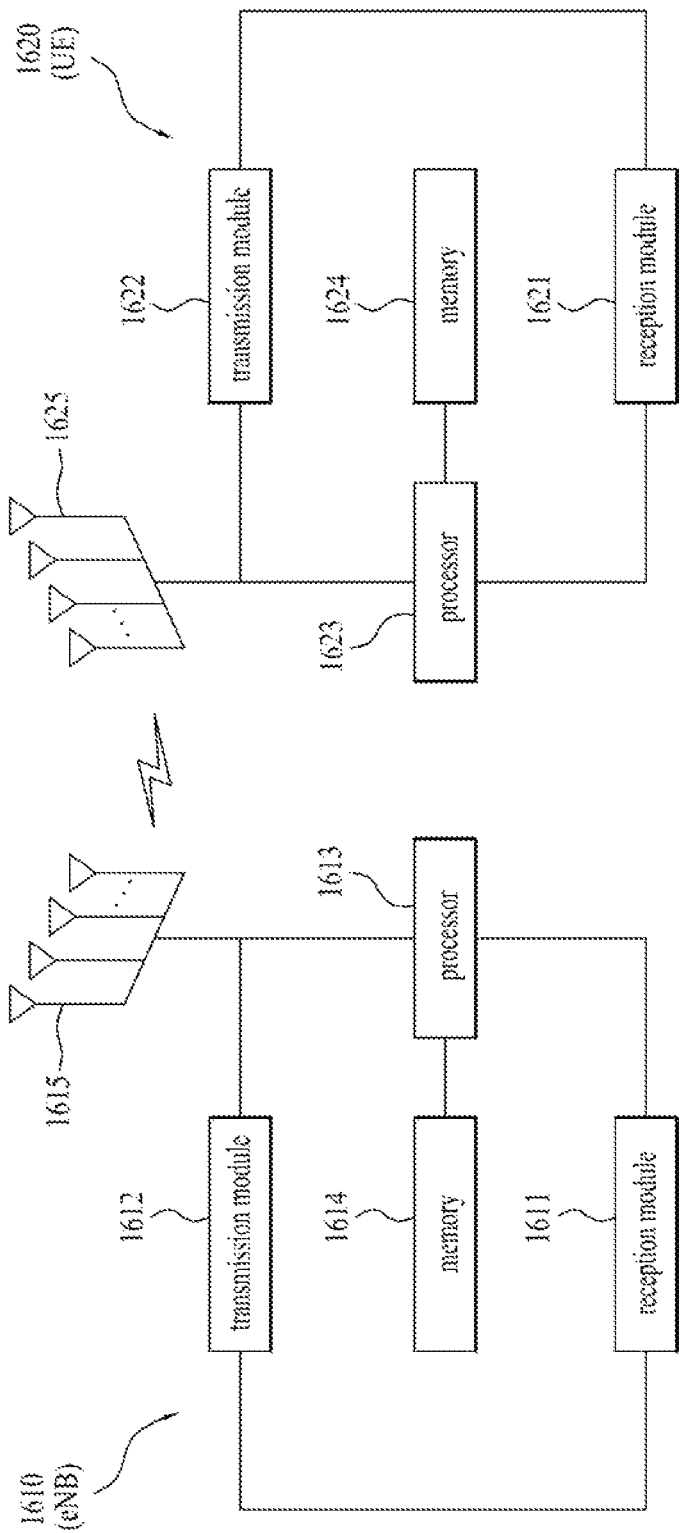
FIG. 16 is a diagram for a configuration of a transceiver.

FIG. 16 is a diagram for a configuration of a transmission point device and a user equipment device according to embodiment of the present invention.

Referring to FIG. 16, a transmission point device 1610 according to the present invention may include a reception module 1611, a transmission module 1612, a processor 1613, a memory 1614, and a plurality of antennas 1615. A plurality of the antennas 1615 means the transmission point device capable of supporting MIMO transmission and reception. The reception module 1611 can receive various signals, a data, and information in UL from the UE. The transmission module 1612 can transmit various signals, a data, and information in DL to the UE. The processor 1613 can control overall operations of the transmission point device 1610.

The processor 1613 of the transmission point device 1610 according to one embodiment of the present invention may make the aforementioned embodiments operable. Besides, the processor 1613 of the transmission point device 1610 is configured to perform a function of processing information received by the transmission point device 1610, information to be transmitted to an external, and the like. The memory 1614 is configured to store the processed information for a prescribed time and can be substituted by such a configuration element as a buffer (not depicted), or the like.

Subsequently, referring to FIG. 16, the UE device 1620 according to the present invention includes a reception module 1621, a transmission module 1622, a processor 1623, a memory 1624, and a plurality of antennas 1625. A plurality of the antennas 1625 means the UE device capable of supporting MIMO transmission and reception. The reception module 1621 can receive various signals, a data, and information in DL from the eNode B. The transmission module 1622 can transmit various signals, a data, and information in UL to the eNode B. The processor 1623 can control overall operations of the UE device 1620.

The processor 1623 of the UE device 1620 according to one embodiment of the present invention may make the aforementioned embodiments operable. Besides, the processor 1623 of the UE device 1620 is configured to perform a function of processing information received by the UE device 1620, information to be transmitted to an external, and the like. The memory 1624 is configured to store the processed information for a prescribed time and can be substituted by such a configuration element as a buffer (not depicted), or the like.

Detail configuration of the transmission point device and the UE device can be implemented to independently apply the aforementioned contents explained in various embodiments of the present invention or to simultaneously apply two or more embodiments. The overlapped contents are omitted for clarity of explanation.

And, in explaining FIG. 16, explanation on the transmission point device 1610 can be identically applied to a relay device as a main agent of DL transmission or a main agent of UL reception. Explanation on the UE device 1620 can be identically applied to a relay device as a main agent of DL reception or a main agent of UL transmission.

Embodiments of the present invention can be implemented using various means. For instance, embodiments of the present invention can be implemented using hardware, firmware, software and/or any combinations thereof.

In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

INDUSTRIAL APPLICABILITY

The aforementioned embodiments of the present invention may be applied to various mobile communication systems.

What is claimed is:

1. A method of performing a handover, which is performed by a user equipment in a wireless communication system, comprising the steps of receiving, from a first transmission point, information necessary for performing the handover to from the first transmission point to a second transmission point, wherein the information necessary for performing the handover comprises information on a system frame of the second transmission point; if the user equipment should receive a second physical broadcast channel (PBCH) from the second transmission point: decoding a first physical broadcast channel (PBCH) of the first transmission point, generating a third physical broadcast channel (PBCH) from the decoding result, and eliminating the generated third physical broadcast channel (PBCH) from a received signal including the second physical broadcast channel (PBCH) of the second transmission point; and if the user equipment fails to decode the second physical broadcast channel (PBCH) of the second transmission point within a first frame, storing the received signal from which the generated third physical broadcast channel (PBCH) is eliminated.

2. The method of claim 1, wherein the information necessary for performing the handover corresponds to a system frame offset between the first transmission point and the second transmission point.

3. The method of claim 1, wherein the information necessary for performing the handover comprises at least one of a system bandwidth of the second transmission point or a physical hybrid automatic repeat request channel (PHICH) configuration.

4. The method of claim 3, wherein the user equipment receives information on valid time of at least one of the information on the system frame, the system bandwidth, or the physical hybrid automatic repeat request channel (PHICH) configuration.

5. The method of claim 1, wherein the information on the system frame is transmitted by the second transmission point on a physical broadcast channel (PBCH).

6. The method of claim 1, wherein the information necessary for performing the handover is received together with a handover command from the first transmission point.

7. The method of claim 1, further comprising the steps of:
receiving a primary and a secondary synchronization signal of the second transmission point; and transmitting a random access preamble to the second transmission point.

8. A user equipment device in a wireless communication system, comprising:
a receiver; and a processor, the processor configured to receive information necessary for a second transmission point to perform a handover from a first transmission point, wherein the information necessary for performing the handover comprises information on a system frame of the second transmission point, wherein, if the user equipment should receive a second physical broadcast channel (PBCH) from the second transmission point, the processor is configured to: decode a first physical broadcast channel (PBCH) of the first transmission point, generate a third physical broadcast channel (PBCH) from the decoding result, and eliminate the generated third physical broadcast channel (PBCH) from a received signal including the second physical broadcast channel (PBCH) of the second transmission point, wherein, if the user equipment fails to decode the second physical broadcast channel (PBCH) of the second transmission point within a first frame, the processor stores the received signal from which the generated third physical broadcast channel (PBCH) is eliminated.

* * * * *